UNITED STATES PATENT OFFICE.

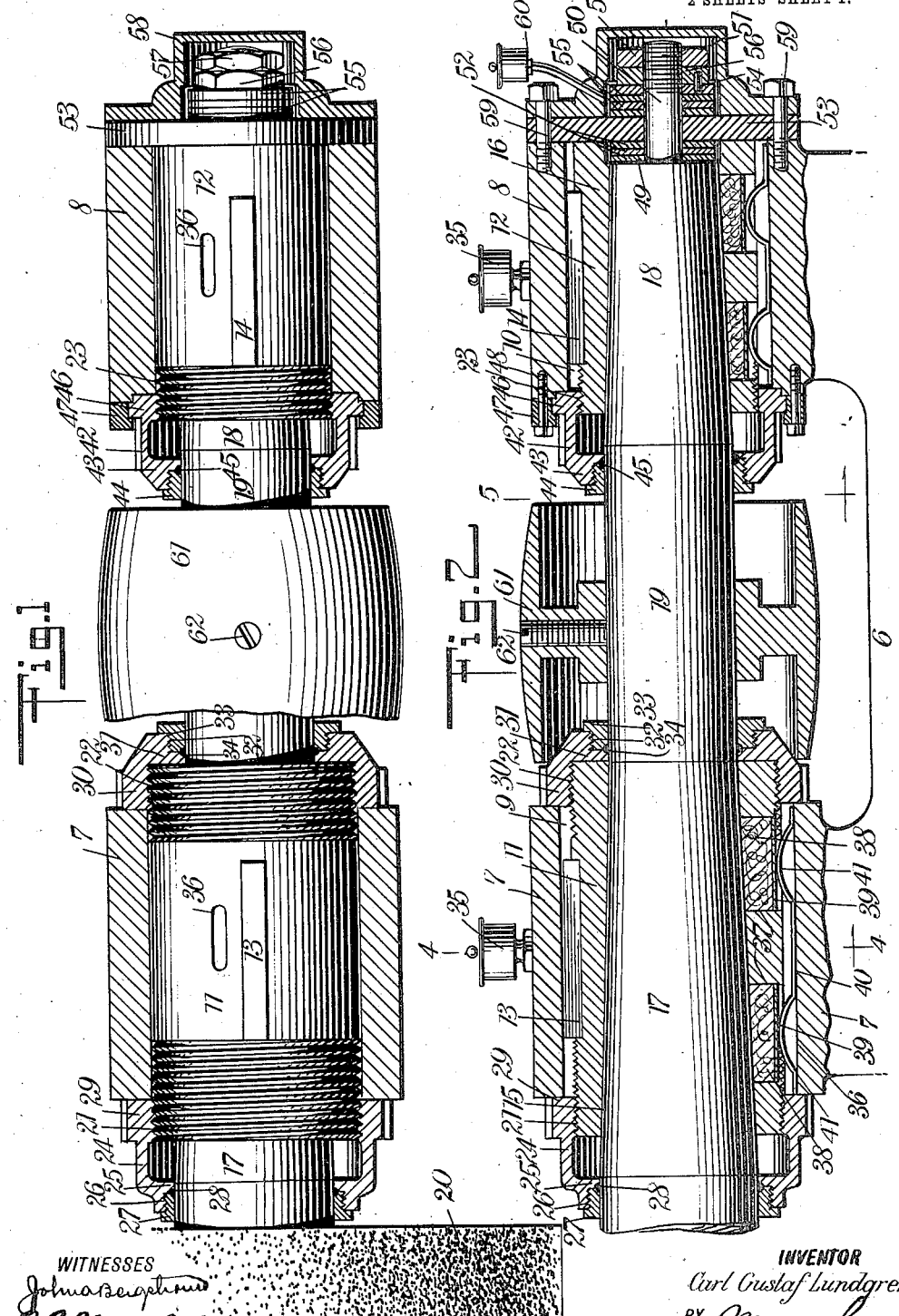

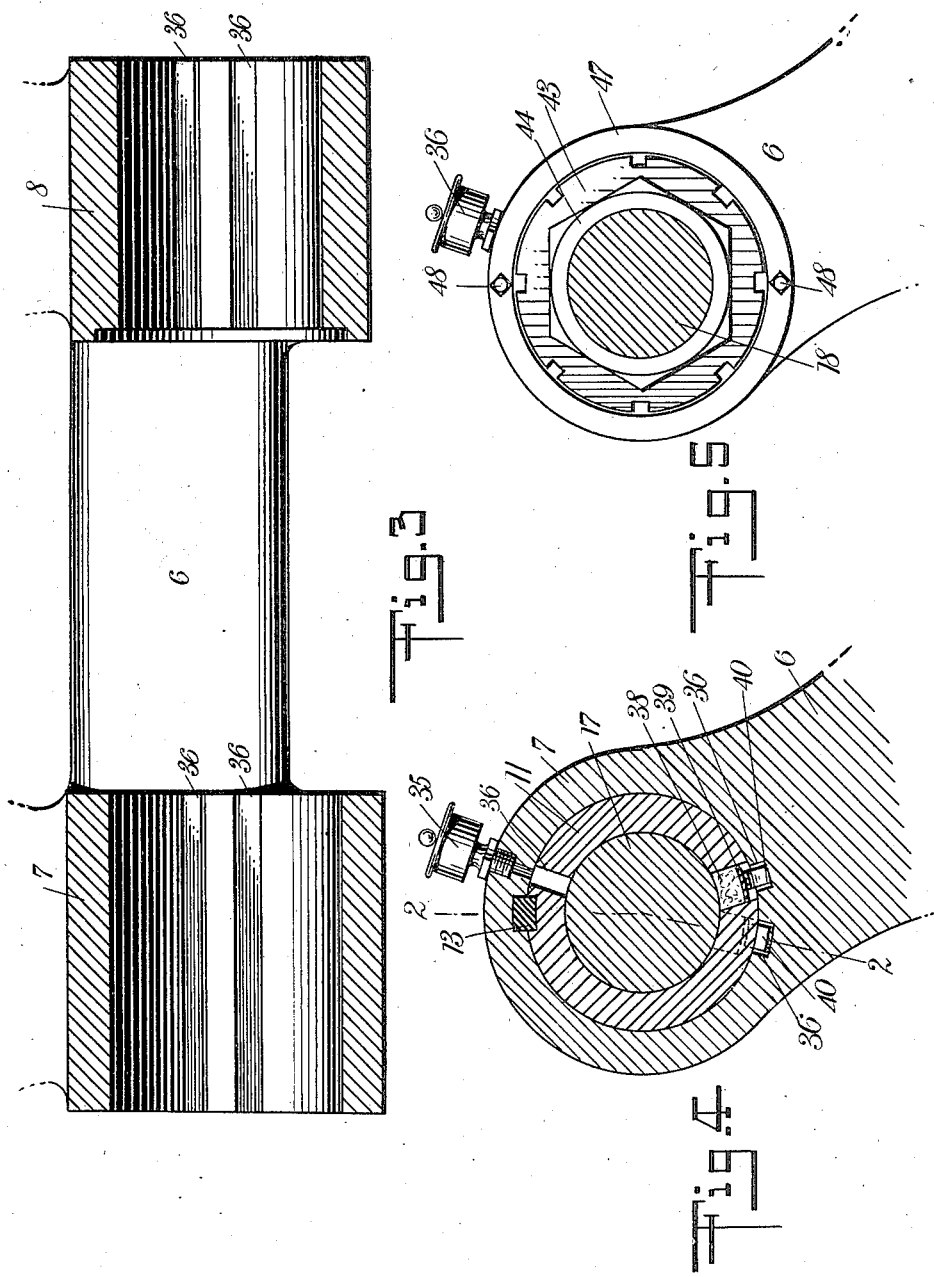

CARL GUSTAF LUNDGREN, OF CHICAGO, ILLINOIS.

BEARING.

1,092,730. Specification of Letters Patent. Patented Apr. 7, 1914.

Application filed July 29, 1911. Serial No. 641,204.

*To all whom it may concern:*

Be it known that I, CARL GUSTAF LUNDGREN, a citizen of the United States, and a resident of Chicago, in the county of Cook and State of Illinois, have invented a new and Improved Bearing, of which the following is a full, clear, and exact description.

My invention relates to bearings, and it has for its object to provide one which may be used on grinding wheel heads, and to provide solid tapering bearing members, which are adjustably secured to the heads, so that they may be moved longitudinally when slightly worn, to fit snugly the tapering portion of the spindle carrying the grinding wheel.

As my bearing is constructed, it fits at all times during and after adjustment, for there is no danger of forcing it out of alinement during adjustment. The bearing fits naturally into position, where it is held rigid against lateral movement while being secured, and it may therefore be removed and replaced with the certainty that it will at all times be in alinement after adjustment. The bearing and its connections are rigid, and it is unnecessary to bend or expand them during adjustment or to secure the bearing in position. The construction of the bearing permits the use of a spindle, which may be hardened without any danger of cold checks.

Additional objects of the invention will appear in the following complete specification, in which the preferred form of the invention is disclosed.

In the drawings similar characters of reference indicate corresponding parts in all the views, in which—

Figure 1 is a sectional plan view of Fig. 2; Fig. 2 is a sectional view, on the line 2—2 of Fig. 4; Fig. 3 is a sectional plan view of the head with the frames showing the lubricant retainers; Fig. 4 is a sectional view on the line 4—4 of Fig. 2, and Fig. 5 is a sectional view, on the line 5—5 of Fig. 2.

By referring to the drawings it will be seen that a head 6 is provided, having frame members 7 and 8, which are spaced from each other, there being openings 9 and 10 disposed longitudinally through the said frame members 7 and 8. Disposed in the said frame members 7 and 8 there are bearing members 11 and 12, the said bearing members being keyed to the said frame members 7 and 8 by means of the keys 13 and 14.

The bearing members 11 and 12 have tapering bearing surfaces 15 and 16, which engage tapering bearing surfaces 17 and 18 on the spindle 19.
It will be seen by examining Figs. 1 and 2 of the drawings that the bearing surfaces and the spindle taper away from the grinding wheel 20, which is secured to the spindle 19. The outer terminals of the bearing member 11 are threaded at 21 and 22, and the outer terminal of the bearing member 12, which is disposed farthest from the grinding wheel 20, is threaded at 23. A screw member 24 has an inner thread which meshes with the thread 21 on the bearing member 11, this screw member 24 having a shoulder 25 which engages the spindle 19, and the said threaded member 24, also has an additional inner thread 26, which is engaged by a threaded collar 27, which is disposed against the said spindle 19. This threaded collar 27 serves to hold a gasket 28 in position against the threaded member 25, the gasket being provided to prevent the leakage of the lubricant from the bearing. The threaded member 24 also has a shoulder 29, which abuts against one end of the frame member 7. The thread 22 at the other end of the bearing member 11 is engaged by a thread on a screw member 30, this screw member 30 abutting against the frame member 7. The screw member 30 also has a shoulder 31, with an inner thread 32, the shoulder 31 abutting against the end of the bearing member 11 and engaging the spindle. The inner thread 32 is engaged by an outer thread on a screw collar 33, the said screw collar 33 engaging the spindle 19, and serving to push the gasket 34 against the shoulder 31 of the said screw member 30. An oil cup 35 is secured to the frame member 7, and serves to lead the lubricant oil to the opening 36', through the top of the bearing member 11. There is a longitudinal opening 36 through the frame member 7, there being openings 37 in the bearing member 11, which communicate with the longitudinal opening 36, and which also extend through the inner surface of the bearing member 11. In these openings 37 there are disposed lubricant retainers 38, which are preferably manufactured of felt with thin brass strips 39 on their outer or lower edges, to keep them in shape.

In the longitudinal grooves 36, there are disposed members 40, having resilient upwardly-projecting portions 41, which press against the lubricant retaining members 38 and tend to hold them yieldingly upward against the spindle 17. It will be seen that these members 40 may be readily removed from the frame members 7 when the screw member 24 has been unscrewed. The threaded terminal of the bearing member 12 is engaged by a thread on a screw member 42, this screw member normally pressing against the frame member 8, and having a shoulder 43, with an inner thread which is engaged by an outer thread on a screw collar 44, this screw collar 44 being in engagement with the spindle 19, and serving to press the gasket 45 against the screw member 43. Disposed around an annular portion 46 of the screw member 42, there is a clamping ring 47, the said clamping ring 47 being secured to the frame member 8 by means of bolts 48. The frame member 8 is provided with an oil cup 35, which feeds the lubricant oil to the bearing member 12, in the same manner as has been described with reference to feeding the oil to the bearing member 11. The spindle 19 is provided with a shoulder 49, and it has a projecting terminal 50, which is threaded at 51. Washers 52 are disposed on this terminal 50, and against these washers presses a thrust plate 53, said thrust plate 53 having an opening 54, through which the terminal 50 of the spindle 19 is disposed. Additional washers 55 are disposed against the outer side of this thrust plate 53, and pressing against these washers 55 there is a nut 56, which meshes with the thread 51 on the terminal 50. A second nut 57 also meshes on the thread 51 of the terminal 50, and presses against the nut 56. A cap member 58 is disposed over the said washers 55, and this cap member 58 is secured, with the thrust plate 53, to the frame member 7 by means of the bolts 59. An oil cup 60 is provided for feeding lubricant oil to the cap 58, so that the terminal 50 of the spindle 19 may be lubricated. Between the frame members 7 and 8 there is disposed a pulley 61, which is mounted on the spindle 19, and which is held in place on the said spindle 19 by means of a set screw 62.

It will be readily understood that when the bearing member 11 wears, the screw members 24 and 30 may be unscrewed to permit of the adjusting of the bearing member 11 against the tapering surface 17 of the spindle 19, and that when the bearing member 11 has been adjusted the screw members 24 and 30 may be screwed in place and against the frame member 7 to hold the bearing member 11 in position. In very much the same manner the bearing member 12 may be adjusted relatively to the tapering surface 18 of the spindle 19, while by freeing the bolts 48 the clamping plate 47 may be removed permitting the adjusting of the screw member 42, on the bearing 12, so that when the annular portion 46 of the screw member 42 is again moved against the end of the frame member 8, the tapering surface 18 of the spindle 19 will be found to be held snugly in the bearing member 12. This having been done, the clamping plate 47 is readjusted. The thrust plate 53, with the associate members, will hold the spindle 19 relatively to the head 6 while these adjustments are being made.

Having thus described my invention I claim as new and desire to secure by Letters Patent:

1. A head having a frame with an opening therethrough, a bearing member having outer threads at a terminal and disposed in the opening, a spindle having a shoulder at one end with a projecting terminal, the tapering spindle being journaled in the bearing member, a screw member meshing with the outer threads on the bearing member and abutting against the frame, a thrust plate having an opening in which the terminal of the spindle is disposed, means abutting against the shoulder of the spindle and engaging the thrust plate at one side, a member secured to the spindle, means engaging the last-mentioned member at the other side of the thrust plate, means securing the thrust plate to the head, and a cap disposed around the terminal of the spindle beyond the thrust plate, and means for securing the cap relatively to the frame.

2. A frame having a longitudinal opening therethrough, and a longitudinal groove connected with the opening, a tapering bearing member having outer threads at its terminals, and disposed in the opening, there being openings in the bearing member extending from the groove through the inner surface of the bearing member, additional members having inner threads meshing with the outer threads on the terminals of the bearing member, the additional members abutting against the frame and inclosing the ends of the longitudinal groove, lubricant retainers disposed in the openings, and resilient means slidable longitudinally in the groove for holding the lubricant retainers in position.

3. A frame having an opening therethrough, a tapering bearing member disposed in the opening and having a threaded terminal, a tapering spindle disposed in the bearing member having a shoulder at one end with a projecting terminal, a screw member meshing with the thread on the bearing member, and abutting against the frame, a clamping ring disposed against the outer side of the screw member for pressing the screw member in the direction of the frame, means for holding the clamping ring in position, a thrust plate having an opening in which the terminal of the spindle is disposed, means for abutting against the shoulder of the spindle, and engaging the thrust plate at one side, a member secured to the terminal of the spindle, means engaging the last-mentioned member at the other side of the thrust plate, and means for securing the thrust plate relatively to the frame.

In testimony whereof I have signed my name to this specification in the presence of two subscribing witnesses.

CARL GUSTAF LUNDGREN.

Witnesses:
KATHRYN KIRWAN,
IRENE BREWER.